(12) United States Patent
Valls

(10) Patent No.: US 6,780,031 B1
(45) Date of Patent: Aug. 24, 2004

(54) CHILD-PROOF ELECTRICAL OUTLET PLATE

(76) Inventor: David John Valls, 2565 Ames St., Edgewater, CO (US) 80214

( * ) Notice: Subject to any disclaimer, the term of this patent is extended or adjusted under 35 U.S.C. 154(b) by 0 days.

(21) Appl. No.: 10/407,776

(22) Filed: Apr. 5, 2003

(51) Int. Cl.⁷ .............................................. H01R 13/62
(52) U.S. Cl. ....................................... 439/147; 439/136
(58) Field of Search ................................ 439/147, 135, 439/136; 174/67

(56) References Cited

U.S. PATENT DOCUMENTS

| | | | | |
|---|---|---|---|---|
| 2,744,243 A | | 5/1956 | Menendez ................... 437/137 |
| 2,820,842 A | | 1/1958 | Meisthill ...................... 174/67 |
| 3,068,442 A | * | 12/1962 | Kubik et al. ................. 439/136 |
| 3,137,407 A | | 6/1964 | MacKiewicz ............... 220/242 |
| 3,956,573 A | | 5/1976 | Myers et al. ................. 174/48 |
| 4,302,624 A | | 11/1981 | Newman ..................... 439/133 |
| 5,348,495 A | * | 9/1994 | Kasden ........................ 439/371 |
| 5,477,010 A | | 12/1995 | Buckshaw et al. ............ 174/67 |
| 5,915,981 A | | 6/1999 | Mehta ......................... 439/137 |
| 5,934,919 A | * | 8/1999 | Cross et al. ................. 439/136 |
| 6,198,046 B1 | | 3/2001 | Moodie ......................... 174/67 |

* cited by examiner

Primary Examiner—Renee Luebke

(57) ABSTRACT

A safety plate assembly that can be easily assembled to a conventional electric outlet using standard mounting methods. The safety plate assembly has openings for accommodating standard electric outlets. The assembly includes a cover plate with parallel guides. A slidable shutter slides along the parallel guides to cover and uncover the live openings of an electric outlet. The shutter has prongs that hold an electric plug into the electric outlet so the plug cannot be unintentionally removed. The assembly has locks on opposite sides of the slidable shutter, so that the small hand of a toddler cannot unlock both locks at the same time. The shutter can be locked into an open, closed, or holding position.

3 Claims, 5 Drawing Sheets

CHILD-PROOF ELECTRICAL OUTLET PLATE

BACKGROUND OF THE INVENTION

This invention is an innovative electrical outlet plate that easily replaces standard electric outlet plates. When installed, electric plugs cannot be pulled out by curious toddlers, nor can children insert objects into vacant outlets. Electric plugs from sensitive equipment, like computers, cannot be accidently pulled from the electric outlet by clumsy adults or pets.

Since electrical contacts of a conventional electric outlet are continuously energized, they represent a source of danger for electric shocks and short circuits. While the prongs of an electrical outlet are designed to be safely inserted within the outlet sockets, it is possible to cause a short circuit by insertion of a wire or other metal object into the sockets. Specifically, small children are frequent explorers, and out of curiosity, insert articles such as safety pins, hair pins, or paper clips into the outlet with resultant shock and possible injury.

Ground Fault Interrupters or GFI's automatically shut off power to an outlet when there is a short. They are required in areas prone to moisture, such as in kitchens and bathrooms, but they are too expensive to be used in every outlet. Renters may not want to pay for the cost of having these expensive outlets, as they should be installed by a licensed electrician.

Another solution is the provision of plastic dummy plugs which plug into the sockets of vacant outlets. However, plastic dummy plugs are easily misplaced or broken, and can be easily removed from the sockets by young children.

BACKGROUND OF THE PRIOR ART

Safety plate assemblies have been proposed to replace the conventional cover plate for the outlet. There are lock boxes that cover or replace the electric outlet. These are large, expensive, and difficult to use. Others use a swinging door that can be locked with switches or magnets. The key can be lost or the magnet that unlocks the door can be easily misplaced.

Some assemblies have used a shutter to cover the electric outlets. The shutters include rotating cover shutters, hinged shutters, and sliding shutters. These covers rotate or slide to cover the outlet against insertion of objects by toddlers. These work well in that aspect, but they do not prevent an electrical plug from being pulled out part-way or completely by a curious toddler. They also do not prevent electric plugs from accidently being pulled out by adults, children, and pets.

Mehta's U.S. Pat. No. 5,915,981 uses a shutter to cover the electric outlet, but the shutter is inside the electric outlet. The electric outlet has to be replaced and a homeowner may not be skilled enough to do the required electric wiring. The instant invention requires no replacing or handling of the electric outlet. Meistrell's U.S. Pat. No. 2,820,842 uses a shutter to cover the electric outlet, but it only closes the shutter when not in use. It cannot keep the electric plug from being pulled out. The shutter is also not locked into the closed position Mendenez's U.S. Pat. No. 2,744,243 uses a shutter that is closed by gravity. It also does not lock closed, nor does it keep an electric plug from being pulled out.

OBJECTS AND ADVANTAGES

This invention is directed to the provision of an improved safety plate assembly for an electric outlet. This invention is simple, durable, inexpensive to manufacture, smooth and efficient in operation, and resistant to any attempt to defeat its safety operation.

The inventive safety plate assembly is intended to replace an existing outlet plate without disturbing the electric wiring. Homeowners commonly remove outlet plates for painting and wallpapering, so this invention can be easily installed by a homeowner with a screwdriver.

The invention assembly includes a combination shutter and locking mechanism on a sliding base, that can be locked into multiple positions. Locked in the closed position, the shutter prevents anything from being inserted into the live electric outlets. Locked into the latch position, the shutter holds an in-use electric plug into the outlet, preventing the plug from being pulled out by toddlers, clumsy adults, or pets. Locked into the open position, an electric plug can be continuously inserted and pulled out, just like a standard outlet plate.

Levers on either side of the outlet are pressed together to lock and unlock the sliding shutter/lock mechanism. Both levers must be depressed at the same time for the mechanism to move. The levers are too far apart for a toddler's fingers to depress both at the same time and move the mechanism. An adult can easily push both buttons at the same time, with just one hand, to move the shutter, for inserting or removing an electric plug.

The invention is simple and inexpensive, so it can be used to replace almost every outlet in a house. The invention can be formed in different sizes to fit electric outlets for high voltage appliances, such as stoves and air conditioners. The invention can have one opening, for single outlets, or two, four, or more openings for multiple electric outlets. The invention is simple to make and simple to use. It can be formed of plastic, wood or metal.

Accordingly, several objects and advantages of my invention are that it helps secure electric plugs into an electric outlet, so they can not be pulled out by curious toddlers or clumsy adults. Objects can not be inserted into vacant electric outlets, since the shutter blocks the opening. Toddlers can not unlock the shutter because the locks are on the far sides of the cover, too far for a toddler's small hand to unlock both locks at the same time.

Another advantage is that sometimes an electric plug can be pulled or jarred from the electric outlet, where it is still connected, and the metal prongs of the electric plug are exposed with an accumulation of dust and pet hair, an electric short could start a fire. A curtain or paper could also fill on the exposed prongs and start a short or fire. This invention prevents an electric plug from being partly pulled out from the electric outlet.

These and other objectives of the invention are achieved by a simple and economical safety plate assembly that allows a homeowner or renter to quickly and easily secure the live outlet from curious children.

Advantages of each will be discussed in the description. Further objects and advantages of my invention will become apparent from a consideration of the drawings and ensuing description.

REFERENCE NUMBERS

Figure 1:
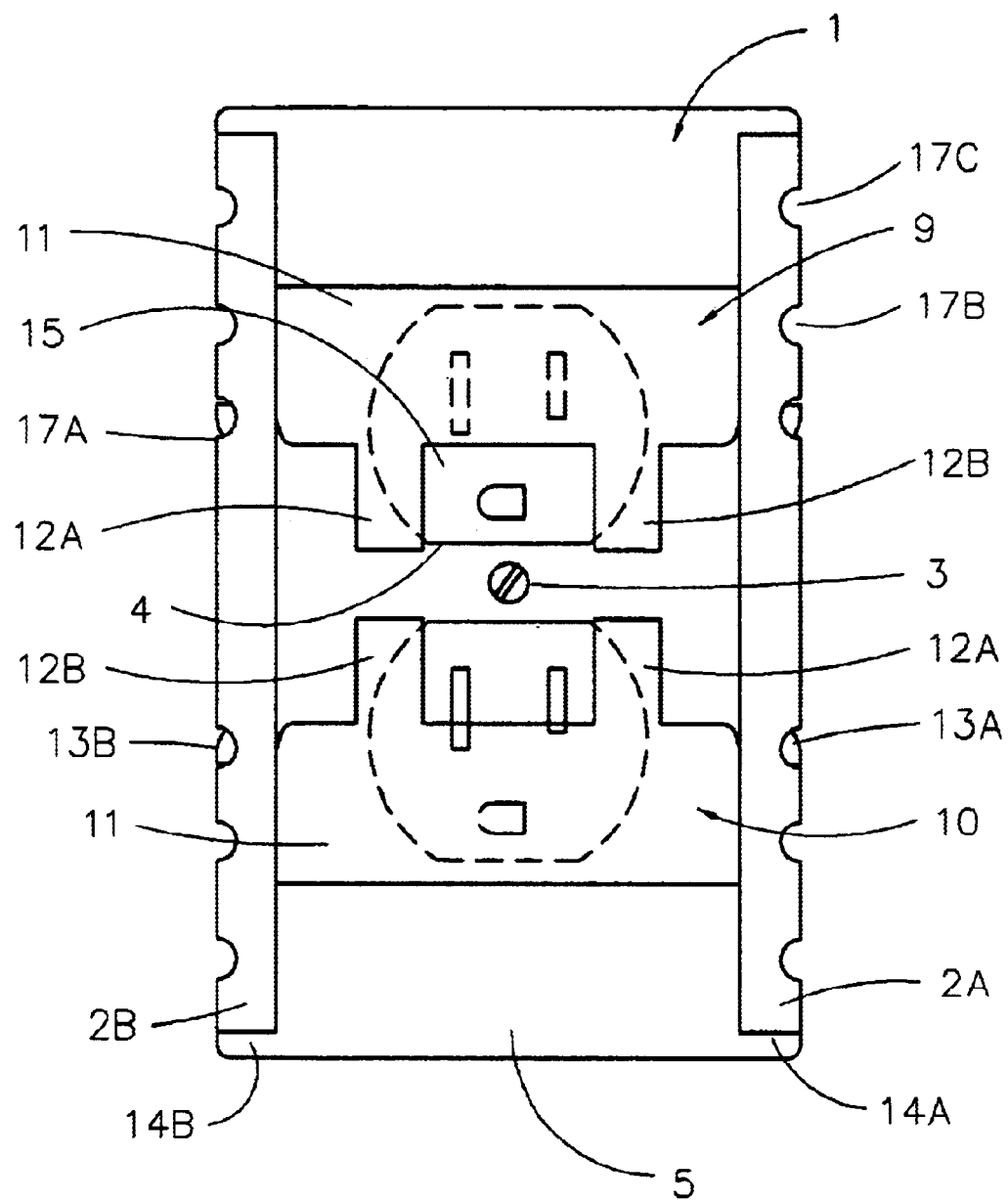
FIG. 1 Front view of the safety outlet plate apparatus showing the top and bottom shutters in closed position.

1. Safety outlet plate
2A. Right rail
2B. Left rail
3. Screw hole
4. Receptacle opening
5. Plate face
6. Electric plug
7. Electric wire
8. Screw
9. Upper shutter
10. Lower shutter
11. Shutter face
12A Right prong
12B. Left prong
13A. Right lever
13B. Left lever
14A. Right key edge
14B. Left key edge
15. Electric receptacle
16A. Right key way
16B. Left key way
17A. Inner slot
17B. Middle slot
17C. Outer slot
18. Wall

SUMMARY

A safety plate assembly that can be easily assembled to a conventional electric outlet using standard mounting methods. The assembly includes a cover plate with a slidable shutter to cover the live openings of an electric outlet. The shutter has prongs that ids hold an electric plug into the electric outlet so the plug cannot be unintentionally removed, and locks on opposite sides of the slidable shutter, so that the small hand of a toddler cannot unlock both locks at the same time.

DESCRIPTION AND OPERATION OF INVENTION

Refer now to FIG. 1 which shows a front view of a safety outlet plate 1 attached to an electric receptacle 15, by a screw in screw hole 3. The safety outlet plate 1 has an upper shutter 9 and lower shutter 10 that can slide up and down along the face 5 of the plate 1. Each shutter is the same. Each shutter 9 and 10 has a right prong 12A and left prong 12B attached to one side. The prongs on each shutter are generally parallel to each other, and the prongs from the upper shutter 9 and lower shutter 10 are generally opposite each other. The shutters 9 and 10 can slide up and down along the right rail 2A and left rail 2B. The shutters are locked into position by a right lever 13A and a left lever 13B.

FIG. 1 shows the upper shutter 9 and lower shutter 10 locked in a closed position. Both shutters are shown covering the live electric outlets of an electric receptacle 15. In the locked position, nothing can be inserted into the live electric contacts of the electric receptacle 15 by a curious toddler. The levers are made from springy plastic. To move either shutter 9 and 10 from the locked position, both the right lever 13A and the left lever 13B must be pushed simultaneously. The distance between each lever 13A and 13B is too great for a toddler's hand to push both at the same time.

Figure 2:
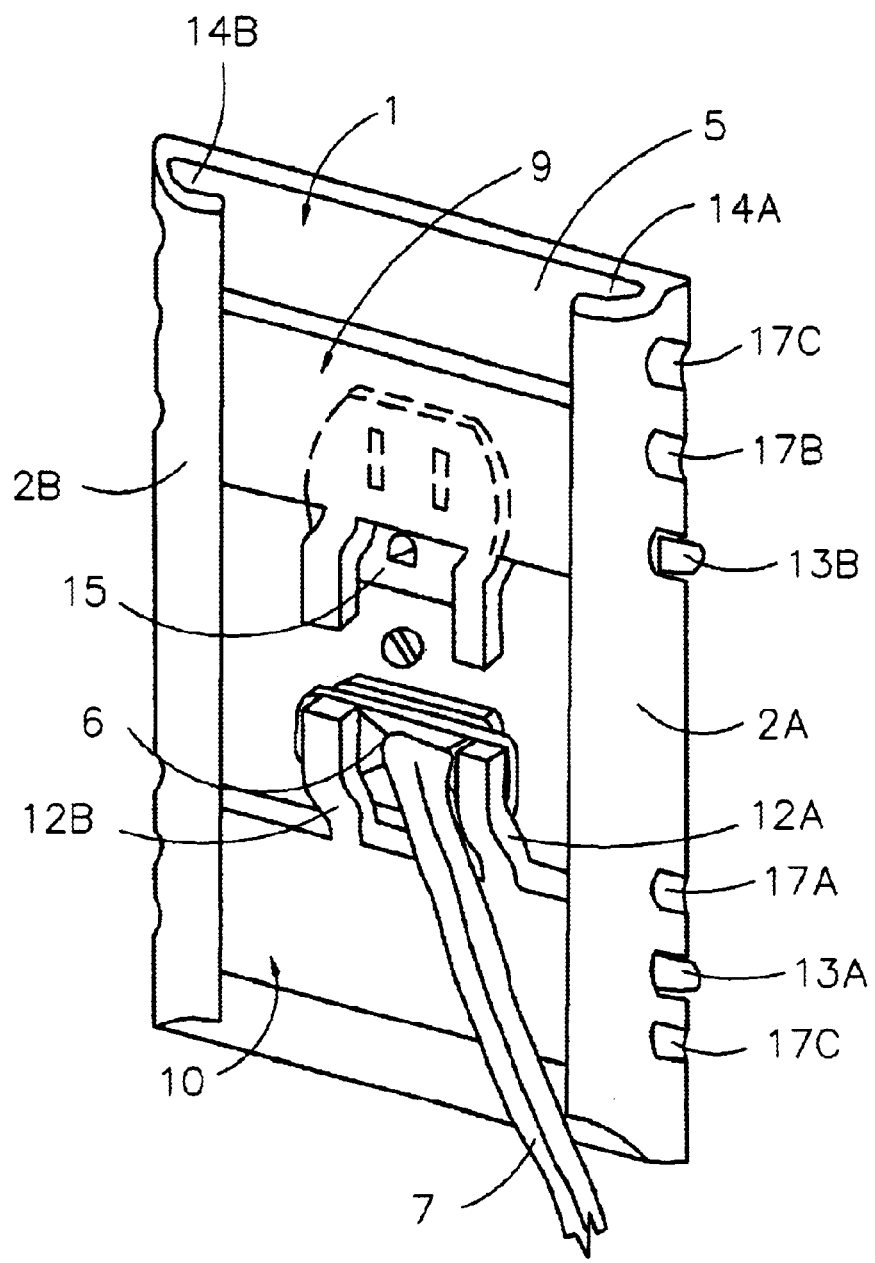
FIG. 2 Perspective view of the safety outlet plate apparatus in use, showing the top shutter in closed position and the lower shutter in the latch position.

Refer now to FIG. 2 which shows the safety outlet plate 1 in use with an electric plug 6. The upper shutter 9 is still in the locked position, covering the live electric outlets of the upper electric receptacle 15. The lower shutter 10 is shown with the right prong 12A and left prong 12B holding the electric plug 6 into the lower electric receptacle 15.

From the closed position in FIG. 1, the right lever 13A and left lever 13B were simultaneously pushed in and slid down along the right rail 2A and left rail 2B. Sliding the lower shutter 10 down exposes the live electric outlets of the lower electric receptacle 15. The electric plug 6 was then inserted into the live electric outlet 15. The lower shutter 10 was then raised into the latched position. With the right prong 12A and left prong 12A holding the electric plug 6 into the electric receptacle 15, the electric plug 6 cannot be pulled out without pressing in both levers 13A and 13B, and pulling the shutter 10 down.

FIG. 2 shows that the upper shutter 9 and lower shutter 10 operate independently of each other. Both can be in the closed position as shown in FIG. 1 or one can be closed and the other latching an electric plug as shown in FIG. 2. If FIG. 2 was turned upside-down, the upper shutter 9 would be latching an electric plug 6 to an electric outlet 15 and the lower shutter 10 would be closed over the live electric outlet. Both the upper shutter 9 and lower shutter 10 can latch electric plugs 6 into the electric receptacle at the same time.

Figure 3B:
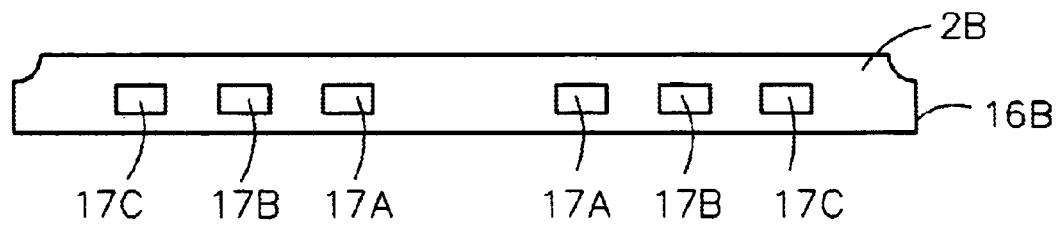
FIG. 3B Side view of a safety outlet plate showing slots.
Figure 3A:
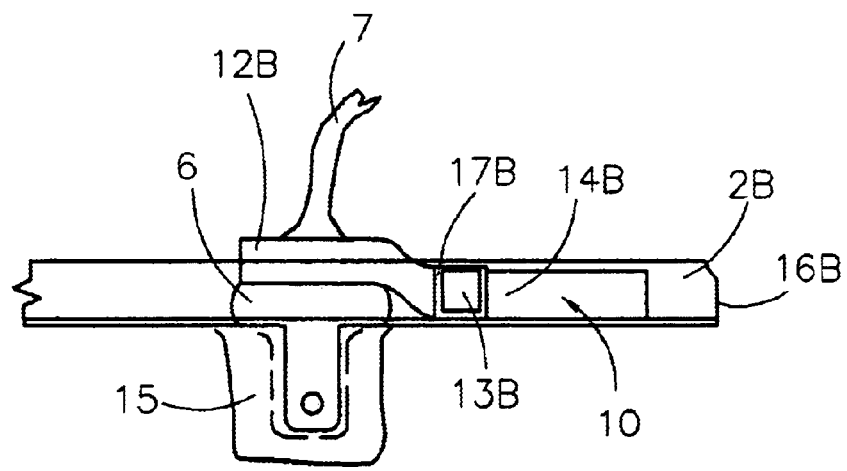
FIG. 3A Side view cross-section showing how the shutter latches an electric plug into an electric receptacle.

Refer now to FIG. 3A which shows a side view cross-section of a shutter 10 latching an electric plug 6 into an electric receptacle 15. This side view shows the left key 14B that would slide under the left rail 2B. The left key 14B and right key 14A allow the shutter 10 to slide up and down, yet still stay flush to the face 5 of the safety outlet plate 1. Also shown is the left lever 13B which when depressed, along with the right lever 13A, allows the shutter 10 to slide up and down.

Refer now to FIG. 3B which shows a side view of a safety outlet plate 1. The levers 13A and 13B are pushed in so that the shutters 9 and 10 can slide. The levers 13A and 13B are pushed into slots, on the right and left sides, that lock the shutters into position. FIG. 3B shows the slots on the left rail 2B on the safety outlet plate 1. The right side would have the same slots. The inner slots 17A lock the shutters 9 and 10 into the closed position, where the shutters block the live electric outlets of the electric receptacle 15, as shown on FIG. 1. The middle slots 17B lock the shutters into the latched position, where the prongs 12A and 12B latch an electric plug 6 into the electric receptacle 15, as shown in the lower shutter 10 on FIG. 2. The outer slots 17C lock the shutters into the open position so an electric plug 6 can be inserted and pulled out at will.

FIG. 3B also shows the location of the left key way 16B, which is hidden in this view. The right side of the safety outlet plate 1 would have a similar right key way 16A.

Figure 3C:
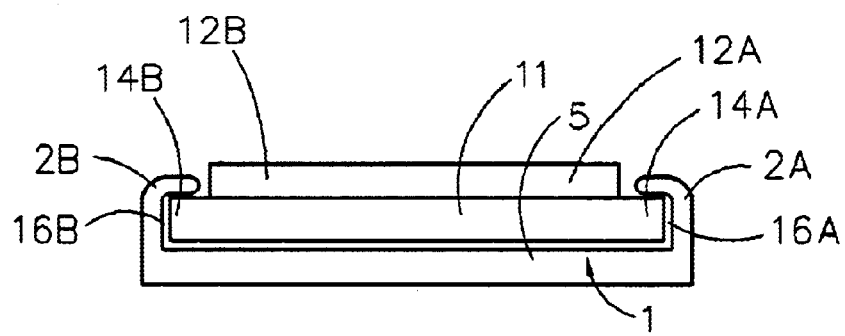
FIG. 3C End view of a safety outlet plate showing how a shutter slides.

Refer now to FIG. 3C which shows an end view of a safety outlet plate 1. Looking up along the plate face 5, the lower shutter 10 can slide along the plate face 5. The shutter's right key edge 14A and left key edge 14B slide in the right key way 16A and left key way 16B selectively.

Figure 4:
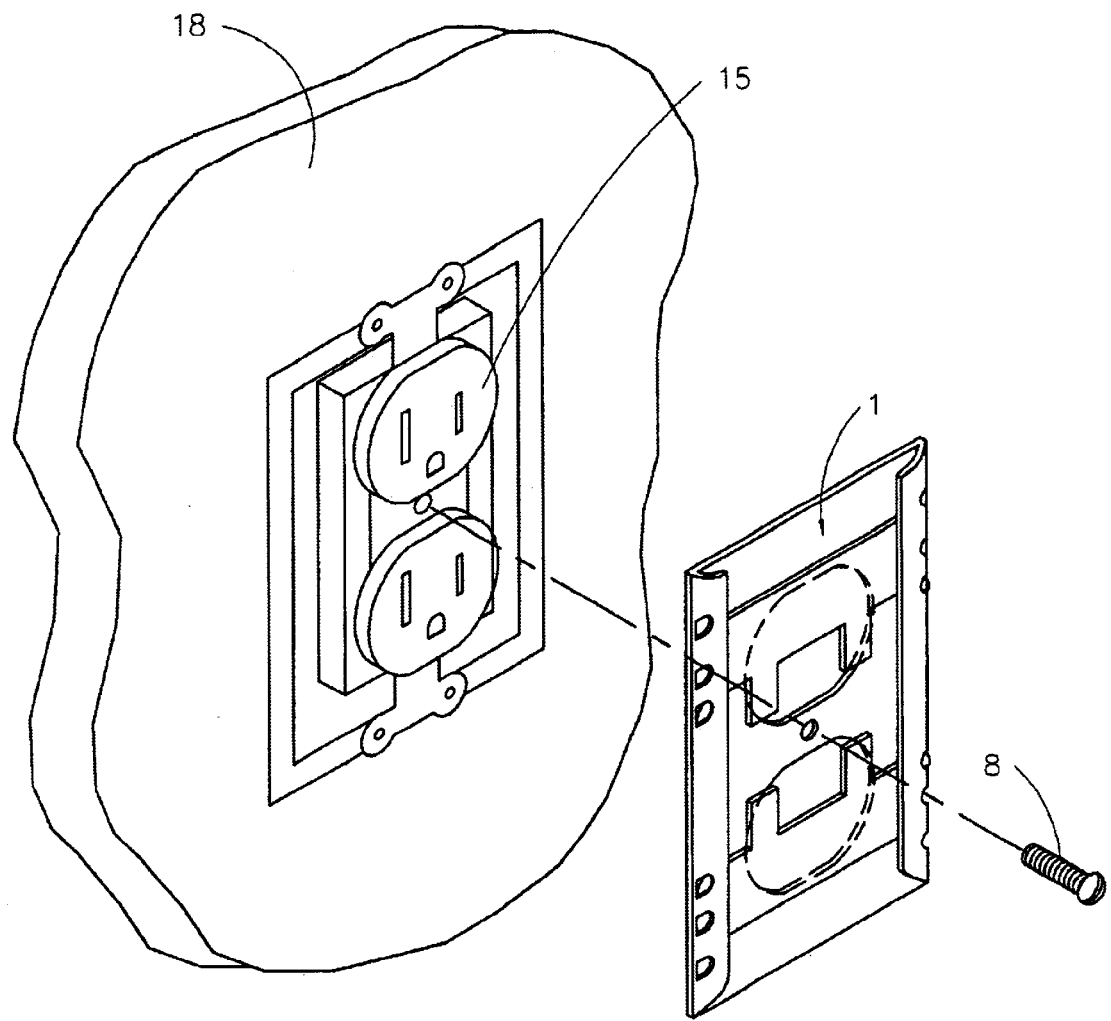
FIG. 4 Perspective view showing how the safety outlet plate is attached to an electric receptacle.

Refer now to FIG. 4 which shows a perspective view of how the safety outlet plate 1 is attached to an electric receptacle 15. The old outlet plate is removed by screwing out a screw. The safety outlet plate 1 is attached to the electric receptacle 15 by a screw 8 through the screw hole 3. Tightening the screw 8, attaches the safety outlet plate 1 to the electric receptacle 15 and to the wall 18. There is no need to touch any wires on the electric receptacle 15 during attachment.

Figure 5:
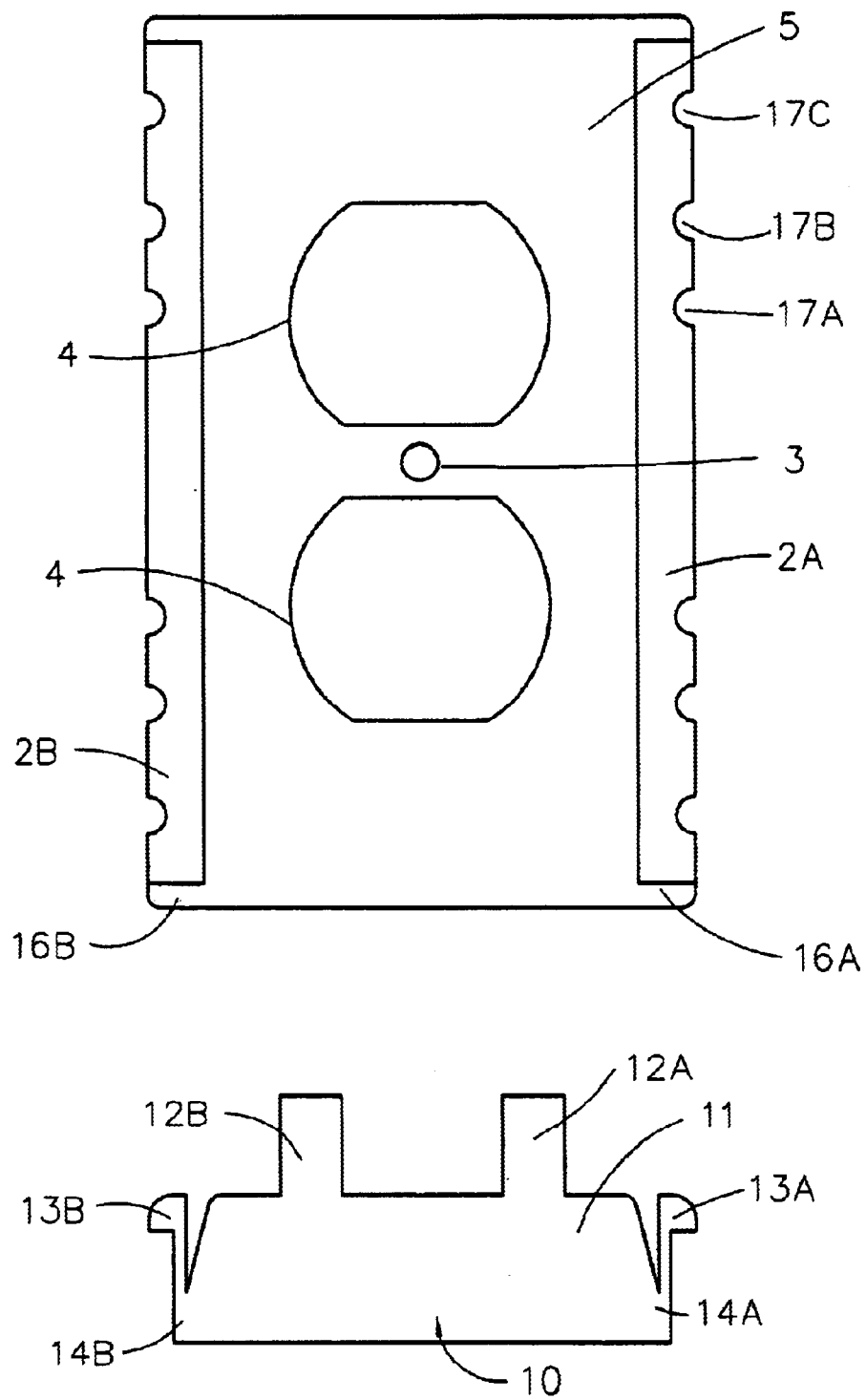
FIG. 5 Front view showing how the safety outlet plate apparatus is made.

Refer now to FIG. 5 which shows how the safety outlet plate 1 is made. The plate face 5 and shutters 9 and 10 are preferably made by injection molding techniques. The upper shutter 9 and lower shutter 10 are the same, they are just inserted toward each other from opposite ends. FIG. 5 shows how the shutters 9 and 10 are inserted so that the right key edge 14A and left key edge 14B slide along the right key way 16A and left key way 16B respectively. When the shutters are slid in they will automatically lock into the first slot, the outer slot 17C, so they can not fill out. The safety outlet plates 1 can be blister-packed or attached to a cardboard back for sale.

Once attached to an electrical outlet, the safety outlet plate is normally used with the shutters in the closed position, so nothing can be inserted. To insert an electric plug, the levers 13A and 13B are simultaneously pushed and the shutter is slid away from the receptacle opening. The electric plug is then inserted into the live electric outlet, and the shutter is slid up to the plug so the prongs hold the electric plug into the outlet. The plug is taken out by reversing the process.

CONCLUSION, RAMIFICATIONS AND SCOPE OF INVENTION

Thus the reader will see that the safety outlet plate of the invention provides a simple, practical, economical and strong electric outlet cover that can be quickly installed using standard tools, by any homeowner, renter or business owner.

While my above description contains many specificities, these should not be construed as limitations on the scope of the invention, but rather as an exemplification of one preferred embodiment thereof. Other variations are possible. For example there can be minor variations in size, and materials. For example, the outlet plate can have more rounded corners, squarer corners, different number of outlet holes, or be thicker or thinner, wider or longer.

The shutter can go up or down, or sideways. The prongs on the shutter can be of different thickness and shape to accommodate different types and styles of electric plugs. Shutters and prongs can be sold separately from the base plate in case the prongs are broken. By selling the shutters and prongs separately, the entire safety plate will not have to be replaced if a different type of electric plug is manufactured in the future. The plate, shutter and prongs can be manufactured for foreign outlets that use different styles of electric plugs, electric outlets, or conversion plugs.

The safety plate can be manufactured for outdoor use by using rubberized shutters or O-rings under the shutters. The safety plate can have tabs for mounting a lock so that the electric plug cannot be pulled out by vandals, such as at an exterior soda machine or remote area.

Accordingly, the scope of the invention should be determined not by the embodiments illustrated, but by the appended claims and their legal equivalents.

I claim:

1. A child-proof safety assembly for use on an electric outlet box with an electric outlet, comprising:

a generally rectangular cover plate having a pair of parallel guides;

a generally rectangular shutter having edges connecting parallel ends, said ends slidable along said parallel guides;

said shutter having a pair of prongs projecting from one edge for holding an electric plug in the electric outlet;

said shutter further having a positioning mechanism on one end for securing the shutter along the guides in one of three different positions.

2. The child-proof safety assembly of claim 1 wherein the three different positions of the shutter are:

an open position allowing insertion of an electric plug into the outlet, a holding position wherein the prongs secure the plug in the outlet, and a closed position preventing insertion of any object into the outlet.

3. The child-proof safety assembly of claim 1 comprising two shutters slidable along the parallel guides for use with a pair of outlets.

\* \* \* \* \*